United States Patent [19]

Unger et al.

[11] Patent Number: 5,792,245
[45] Date of Patent: Aug. 11, 1998

[54] DRYING CARTRIDGE FOR AIR DRYING INSTALLATIONS, ESPECIALLY FOR COMPRESSED-AIR BRAKE SYSTEMS OF VEHICLES

[75] Inventors: Hans Unger, Unterschleissheim; Wolfgang Hatz, Munich; Herbert Tschewik, Heimhausen, all of Germany

[73] Assignee: Knorr Bremse Systeme Fur Nutzfahrzeuge GmbH, Munich, Germany

[21] Appl. No.: 648,196

[22] PCT Filed: Mar. 3, 1995

[86] PCT No.: PCT/DE95/00298

§ 371 Date: May 23, 1996

§ 102(e) Date: May 23, 1996

[87] PCT Pub. No.: WO95/25655

PCT Pub. Date: Sep. 28, 1995

[30] Foreign Application Priority Data

Mar. 22, 1994 [DE] Germany ............ 44 09 871.5

[51] Int. Cl.$^6$ ............................................ B01D 53/02
[52] U.S. Cl. .................... 96/137; 55/DIG. 17; 96/147; 96/149
[58] Field of Search ............ 96/147, 149, 152, 96/151, 137, 108; 55/318, DIG. 17

[56] References Cited

U.S. PATENT DOCUMENTS

| 3,680,283 | 8/1972 | Jones, Jr. ............... | 55/DIG. 17 |
|---|---|---|---|
| 3,796,025 | 3/1974 | Kasten ................... | 55/DIG. 17 |
| 4,487,617 | 12/1984 | Dienes et al. ........... | 55/DIG. 17 |
| 4,544,385 | 10/1985 | Tanaka .................. | 55/DIG. 17 |
| 4,572,725 | 2/1986 | Kojima .................. | 96/137 |
| 4,713,094 | 12/1987 | Yanagawa et al. ....... | 96/147 |
| 4,764,189 | 8/1988 | Yanagawa et al. ....... | 96/137 |
| 4,816,047 | 3/1989 | Neal ..................... | 96/137 |
| 4,946,485 | 8/1990 | Larsson ................. | 96/152 |
| 5,002,593 | 3/1991 | Ichishita et al. ......... | 96/137 |
| 5,427,609 | 6/1995 | Zoglman et al. ......... | 96/137 |
| 5,595,588 | 1/1997 | Blevins .................. | 96/147 |

*Primary Examiner*—Duane S. Smith
*Attorney, Agent, or Firm*—Barnes & Thornburg

[57] ABSTRACT

A drying cartridge for air drying systems, especially for compressed-air brake systems of vehicles, has an inner pot and an outer pot. The components used for the air drying, including a pressure spring used for compressing the drying agent, are arranged inside the inner pot constructed as a preassembled unit, in which case the inner pot can be inserted flush into the outer pot. By usage of an interior-cylindrical wall, the inner pot surrounds a duct which penetrates the drying cartridge in the axial center, through which duct a screw is guided for fastening the drying cartridge on the dryer casing.

8 Claims, 2 Drawing Sheets

DRYING CARTRIDGE FOR AIR DRYING INSTALLATIONS, ESPECIALLY FOR COMPRESSED-AIR BRAKE SYSTEMS OF VEHICLES

BACKGROUND AND SUMMARY OF THE INVENTION

The invention relates to a drying cartridge for vehicle compressed-air brake systems.

In the case of drying cartridges of the concerned type (for example, German Patent Document DE-PS 32 32 742) which, according to their use, are called "disposable cartridges", a face cover is fastened to the underside of a pot, for example, by a flanged connection. The face cover has a threaded element in the center for fixing the cartridge on a dryer casing. Devices are provided which prevent the granulates or drying agent from escaping through the center to the outside. Thus, the drying cartridge can be handled without special measures; that is, after being unscrewed from the dryer casing, it can be stored intermediately or be used as a disposable part. The face covers used for such drying cartridges or their flanged connections with the pot of the drying cartridge result in high expenditures with respect to the material and with respect to the thickness of the material. Because of the unreleasable flanged connection, a separate disposal of the filter material and the material of the granulates and the reuse of the other piece parts situated in the drying cartridge is possible only by disproportionately high expenditures. The drying cartridge is therefore only used as a disposable part.

During the manufacturing of drying cartridges of the concerned type, the demands for an environmental compatibility which is as extensive as possible become increasingly important. Thus, because of the long-term effect of rust, it is undesirable to store contaminated drying cartridges, that is, drying cartridges enhanced with oil particles, in large numbers as disposable parts and to take them to a waste dump.

Based on the above, it is an object of the invention to develop a drying cartridge of the concerned type in such a manner that a simplified handling on the vehicle is permitted. It is to be ensured that the drying cartridge or its components, after being detached from the dryer casing, can be handled as a constructional unit and can be supplied to a recycling without any escaping of the filter material or granulate material from the interior of the cartridge.

By using an inner pot which, contains the drying agent and which can be inserted into an outer pot as a preassembled unit, a simple exchange at the vehicle is possible. That is, the inner pot with the preliminary filter situated in it and with the granulate material, after an extended use, can be replaced by a new inner pot with a new filling without demounting of the inner pot with the problems of the escaping of the granulate material and of the relaxing of the pressure spring. Since the pressure spring, in its tensioned position, remains in the interior of the inner pot, no special measures are required for relaxing the spring. After a new inner pot is inserted into the outer pot, the mounting of the cartridge on the air dryer casing can be carried out in a simple manner by the screw which centrally penetrates the cartridge. In this fashion, a high proportion of the components of the cartridge can be reused; the inner pot can be recycled; that is, important components of the inner pot can be used again after the exchange of the preliminary filter and the drying material.

The division of the interior of the inner pot into two chambers is also very advantageous because the outer flow-through space between the exterior wall of the inner pot and the interior wall of the outer pot which is customary in the case of conventional drying cartridges will now be absent. That is, the outer pot is provided only for the flush accommodation of the inner pot and for the mounting on the dryer casing.

Advantageous developments and further developments are indicated in additional claims.

In the following, the invention is explained by means of embodiments with reference to the attached drawing.

DETAILED DESCRIPTION OF THE PREFERRED EMBODIMENTS

Figure 1:
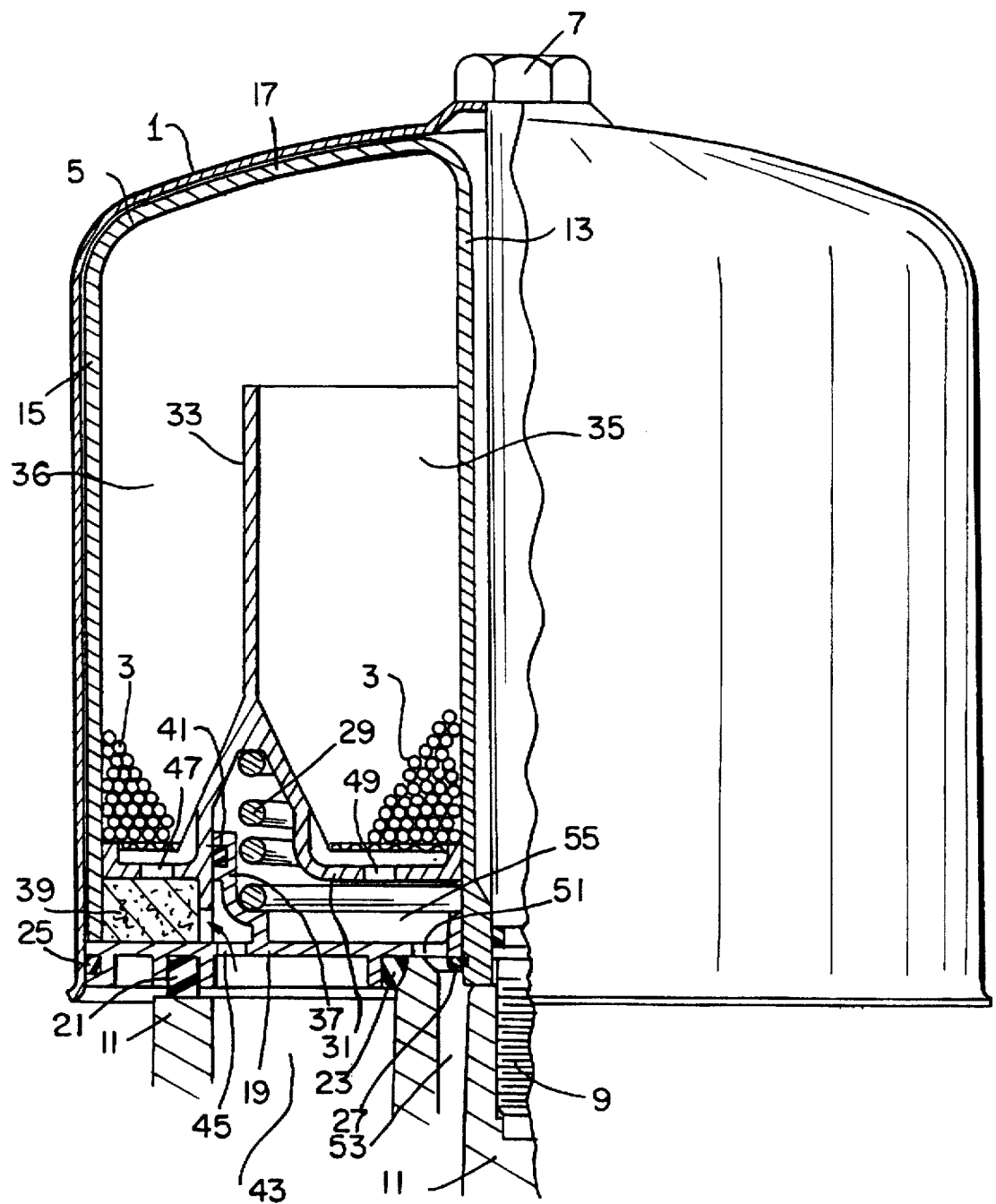
FIG. 1 is a sectional view, which is cut in half, of the drying cartridge according to the invention.

A drying or filter cartridge according to the invention, which is illustrated in the drawing, has an outer pot 1 in which an inner pot 5 is situated which contains a drying agent 3. A screw 7 extends centrally through the drying cartridge and has a threaded end 9 situated at the lower end of the screw being used for the screwed connection of the drying cartridge with the dryer casing 11 partially illustrated in FIGS. 1 and 2. The inner pot 5 has an annular-disk-shaped cross-section; that is, in the longitudinal sectional view, an interior cylinder 13 and an exterior cylinder 15 are provided which are connected with one another by a roof section 17. In the manner illustrated in FIGS. 1 and 2, the inner pot 5 is placed closely against the contour of the outer pot 1 so that there is essentially no space between the inner pot and the outer pot.

In the case of the embodiment according to FIG. 1, a cover 19 is provided on the base of the inner pot 5, and, by means of two packing rings 21 and 23, rests on the dryer casing 11 and, when the screw 7 is tightened, seals off the outside air with respect to the interior housing. Another packing ring 25 on the outer circumference of the cover 19 seals off the interior wall of the outer pot 1. By means of a retaining ring 27, the cover 19 supporting a pressure spring 29 is held on the outer circumference of the interior cylinder 13 in such a manner that the inner pot 5 can be handled as a separate unit if it is detached from the outer pot 1 in the manner described in the following.

Above the cover 19, in the interior of the inner pot 5, a bottom 31 is situated which has a separating wall 33 axially extending from the bottom 31. The separating wall 33 divides the interior of the inner pot 5 into an inner chamber 35 and an outer chamber 36. The two chambers have identical flow cross-sections and are used for accommodating the drying agent 3 which is compressed by means of the pressure spring 29 or the bottom 31 acted upon by the pressure spring 29. On one side, the pressure spring 29 is supported on an extension 37 projecting from the cover 19 and, on the other side, the pressure spring 29 is supported in an indentation of the bottom 31; that is, the pressure spring 29 is a component of the inner pot 5.

Between the cover 19 and the bottom 31, a conventional preliminary filter 39 is situated in contact with the exterior cylinder 15. Since the extension 37, which supports the pressure spring 29, is sealed off with respect to the bottom by a packing ring 41, the chamber accommodating the preliminary filter 39 is sealed off with respect to the chamber accommodating the pressure spring 29. The air to be dried, according to the arrow, enters from the chamber 43 of the dryer casing 11, after passing the opening 45 situated in the cover 19, into the preliminary filter 39, from where, after a rough cleaning, it passes through another opening 47 in the bottom 31 and reaches the interior of the outer chamber 36 containing drying agent (in the drawing, only partially filled). The air is guided within the drying agent 3 around the upper edge of the separating wall 33 and finally leaves the inner chamber 35 through the opening 49 of the bottom 31. Then the dried air passes through another opening 51 in the cover 19 and enters the chamber 53 of the dryer casing, where it is supplied to a further use. The pressure spring 29 is situated in the space 55 formed radially inside the packing ring 41 between the cover 19 and the bottom 31; that is, the pressure spring is subjected to dried air and is therefore less endangered by corrosion.

The cartridge according to the invention can be used in a very simple manner because the inner pot 5 forms a premounted unit in which the pressure spring 29 is situated. The exchange of the inner pot 5 can be carried out on the vehicle, in which case, after the unscrewing of the screw 7, the cartridge consisting of the inner pot 5 and the outer pot 1 is lifted off the dryer casing 11. The inner pot 5 can be pulled out of the outer pot 1 as a unit without the requirement of special measures for securing the pressure spring 29. After the removal of the inner pot 15, a new inner pot provided with a regenerated drying agent 3 can again be inserted into the outer pot 1, after which the cartridge consisting of the inner pot 5 and the outer pot 1 is mounted on the dryer casing 11 and finally the screw 7 is introduced and tightened such that the sealing-off with respect to the dryer casing 11 is caused.

Figure 2:
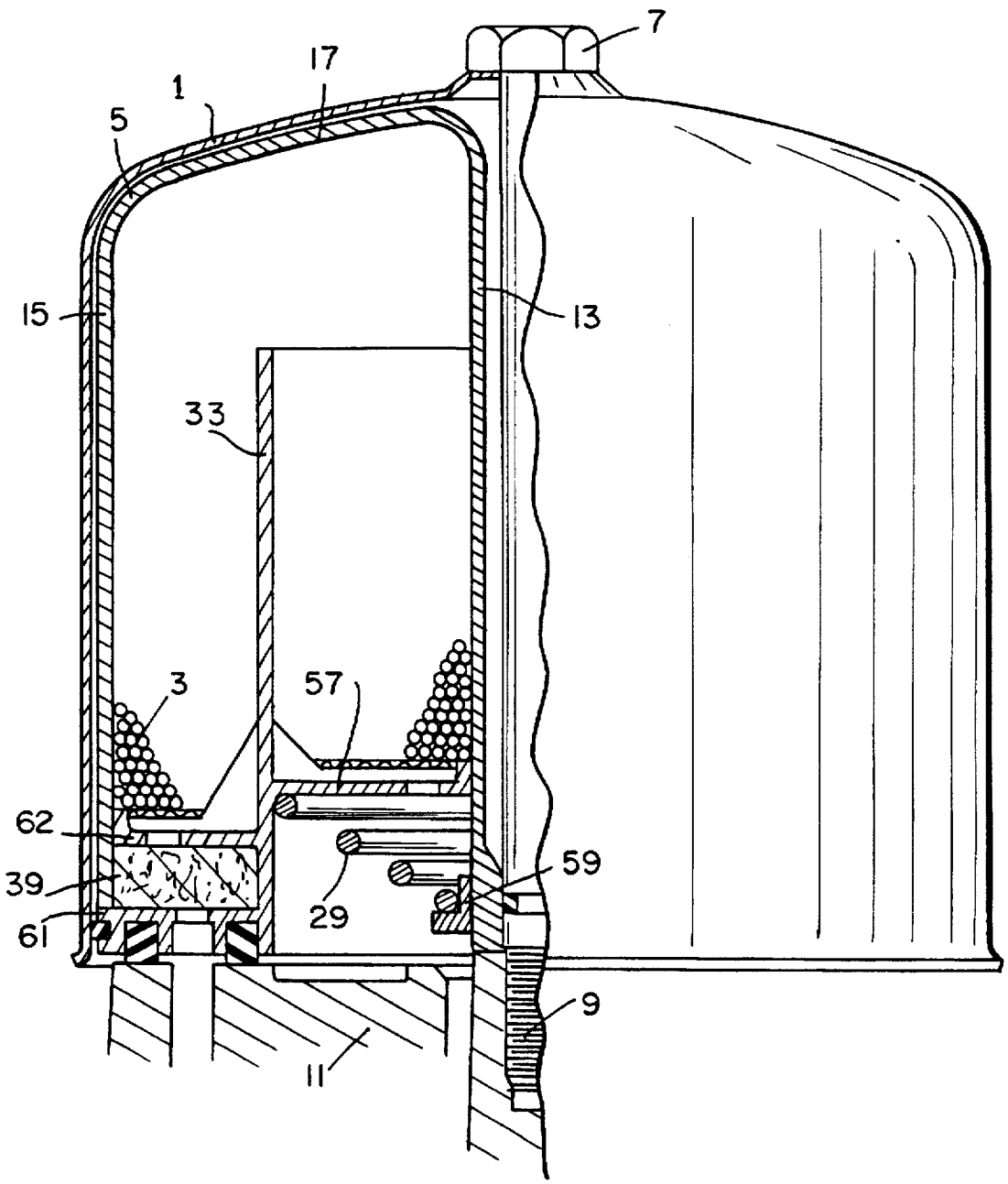
FIG. 2 is a view, which is comparable to FIG. 1, of an air drying cartridge according to another embodiment of the invention.

The embodiment illustrated in FIG. 2, like the embodiment according to FIG. 1, is constructed such that the inner pot 5 is provided and can be handled as a preassembled unit. In contrast to the construction according to FIG. 1, a component which can be compared with the cover 19 is not provided; that is, the bottom 57 of the cartridge according to FIG. 2 is at the same time constructed as a cover and forms the closure of the underside of the inner pot 5, in which case the preliminary filter 39, in a manner which can be compared with the embodiment according to FIG. 1, is held between a cover part 61 and a bottom part 62. On one side, the pressure spring 29 is supported on the bottom 57 and, on the other side, on a retaining ring 59 which can be fixed on the exterior wall of the interior cylinder 13. The flow path of the air to be dried is constructed in a manner which can be compared with the embodiment according to FIG. 1; that is, the pressure spring 29 is guided in dry air and is therefore protected from corrosion.

The inner pots 5 of the embodiment according to FIGS. 1 and 2, which are preassembled as a unit, after the use, that is, after the exchange, can be recycled. In which case, after the demounting of the retaining ring 27 or 59, the piece parts are taken out of the inner pot 5 and optionally are cleaned, in which case the preliminary filter 59 as well as the drying agent 3 may either be regenerated or replaced. In any case, the preassembled unit of the inner pot 5 permits a fast exchange on site; that is, on the vehicle itself, without the requirement of having to accept the demounting problems existing in the case of known air drying cartridges.

We claim:

1. Drying cartridge for air drying installations having a drying casing, comprising:

an outer pot;

an inner pot in said outer pot and having an annular-disk shaped cross-section including an interior cylinder and an exterior cylinder joined by a roof section;

the exterior cylinder of the inner pot being flush against the interior wall of the outer pot and the roof section of the inner pot being flush against the interior side of a roof of the outer pot;

a closure of the inner pot facing the dryer casing being detachably fixed on the interior cylinder of the inner pot;

a drying agent in said inner pot;

a screw extending through said interior cylinder for the fastening the drying cartridge on the dryer casing; and said inner pot, drying agent and closure forming a preassembled, reusable unit.

2. Drying cartridge according to claim 1, including a separating wall which extends axially from the bottom and which divides the interior of the inside pot into an interior chamber and an exterior chamber in such a manner that the air to be dried flows first through the exterior chamber and then through the interior chamber.

3. Drying cartridge according to claim 1 including a packing ring on the outer circumference of said closure acting with respect to the interior wall of the outer pot.

4. Drying cartridge according to claim 1 including a pressure spring in said inner pot as a premounted component and compressing the drying agent situated in the interior of the inner pot.

5. Drying cartridge for air drying installations having a drying casing, comprising:

an outer pot;

an inner pot in said outer pot and having an annular-disk shaped cross-section including an interior cylinder and an exterior cylinder joined by a roof section;

a closure of the inner pot facing the dryer casing being detachably fixed on the interior cylinder of the inner pot;

a drying agent in said inner pot;

a screw extending through said interior cylinder for the fastening the drying cartridge on the dryer casing;

a packing ring on the outer circumference of said closure acting with respect to the interior wall of the outer pot; and said inner pot, drying agent and closure forming a preassembled, reusable unit.

6. Drying cartridge for air drying installations having a drying casing, comprising:

an outer pot;

an inner pot in said outer pot and having an annular-disk shaped cross-section including an interior cylinder and an exterior cylinder joined by a roof section;

a closure of the inner pot facing the dryer casing;

a retaining ring in a groove on said interior cylinder and engaging and detachably fixing said closure on the interior cylinder of the inner pot;

a drying agent in said inner pot;

a screw extending through said interior cylinder for the fastening the drying cartridge on the dryer casing; and said inner pot, drying agent and closure forming a preassembled, reusable unit.

7. Drying cartridge for air drying installations having a drying casing, comprising:

an outer pot;

an inner pot in said outer pot and having an annular-disk shaped cross-section including an interior cylinder and an exterior cylinder joined by a roof section;

a cover of the inner pot facing the dryer casing being detachably fixed on the interior cylinder of the inner pot;

a drying agent in said inner pot;

a bottom in the interior of the inner pot resting in a displacable manner on the drying agent;

a filter between the cover and the bottom, in the area of the outer circumference of the inner pot;

a pressure spring being in a space between the cover and the bottom exposed to dried air and displacing the bottom in the inner pot;

a screw extending through said interior cylinder for the fastening the drying cartridge on the dryer casing; and said inner pot, drying agent and closure forming a preassembled, reusable unit.

8. Drying cartridge for air drying installations having a drying casing, comprising:

an outer pot;

an inner pot in said outer pot and having an annular-disk shaped cross-section including an interior cylinder and an exterior cylinder joined by a roof section;

a closure of the inner pot facing the dryer casing being detachably fixed on the interior cylinder of the inner pot;

a drying agent in said inner pot;

a pressure spring supported at one end on the underside of the closure and, at the other end, on the interior cylinder of the inner pot;

a screw extending through said interior cylinder for the fastening the drying cartridge on the dryer casing; and said inner pot, dying agent and closure forming a preassembled, reusable unit.

* * * * *